(12) United States Patent
Yamada

(10) Patent No.: US 7,380,134 B2
(45) Date of Patent: May 27, 2008

(54) INFORMATION RECORDING/REPRODUCING APPARATUS AND METHOD OF EXECUTING ENCRYPTION PROCESSING

(75) Inventor: Masahiro Yamada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 867 days.

(21) Appl. No.: 10/392,309

(22) Filed: Mar. 20, 2003

(65) Prior Publication Data

US 2003/0179886 A1   Sep. 25, 2003

(30) Foreign Application Priority Data

Mar. 20, 2002   (JP) ............................. 2002-079621

(51) Int. Cl.
| | |
|---|---|
| G06F 12/14 | (2006.01) |
| H04L 9/00 | (2006.01) |
| H04L 9/32 | (2006.01) |
| H04N 7/167 | (2006.01) |
| H04K 1/00 | (2006.01) |
| G11B 15/12 | (2006.01) |

(52) U.S. Cl. ....................... 713/193; 713/165; 713/187; 726/26; 380/201; 380/229; 380/230; 380/255; 705/51; 360/62

(58) Field of Classification Search ................. 713/193
See application file for complete search history.

(56) References Cited

U.S. PATENT DOCUMENTS

| | | | | |
|---|---|---|---|---|
| 6,094,723 | A * | 7/2000 | Otsuka .......................... 726/31 |
| 6,449,724 | B1 * | 9/2002 | Sakagami ..................... 713/300 |
| 6,738,904 | B2 * | 5/2004 | Linnartz et al. .............. 713/189 |
| 6,782,190 | B1 * | 8/2004 | Morito .......................... 386/94 |
| 6,785,192 | B2 * | 8/2004 | Ukita et al. ................... 368/10 |
| 6,832,319 | B1 * | 12/2004 | Bell et al. .................... 713/193 |
| 6,889,323 | B2 * | 5/2005 | Sugahara et al. ........... 713/170 |
| 7,003,046 | B2 * | 2/2006 | Hayami et al. .............. 375/271 |
| 7,092,911 | B2 * | 8/2006 | Yokota et al. ................. 705/57 |
| 7,096,504 | B1 * | 8/2006 | Tagawa et al. ................ 726/27 |
| 7,209,558 | B2 * | 4/2007 | Okuyama .................... 380/201 |

(Continued)

FOREIGN PATENT DOCUMENTS

EP   997900 A2 *   5/2000

(Continued)

OTHER PUBLICATIONS

T.S. Perry, DVD copy protection: take 2, 2005, IEEE, pp. 38-39.*

(Continued)

*Primary Examiner*—Ayaz Sheikh
*Assistant Examiner*—Aravind K Moorthy
(74) *Attorney, Agent, or Firm*—Pillsbury Winthrop Shaw Pittman, LLP

(57) ABSTRACT

An information recording apparatus has a content encryption section which encrypts content information with an encryption key and outputs encrypted content information, a control section which identifies an already moved area in the content information and generates a reproduction enable condition containing reproducible area information indicating a movable area, a hash arithmetic device which executes hash calculation for the reproduction enable condition and stores an arithmetic result in a register, and a hard disk drive which records the encrypted content information output from the encryption section and the reproduction enable condition. Even content information that remains after interruption during movement can be moved.

12 Claims, 5 Drawing Sheets

U.S. PATENT DOCUMENTS

| | | | |
|---|---|---|---|
| 2002/0025039 A1* | 2/2002 | Kato et al. .................... | 370/44 |
| 2003/0152223 A1 | 8/2003 | Yamada | |
| 2006/0053249 A1* | 3/2006 | Yamaki et al. .............. | 711/112 |

FOREIGN PATENT DOCUMENTS

| | | |
|---|---|---|
| EP | 1450367 A1 * | 8/2004 |
| JP | 07-230668 | 8/1995 |
| JP | 10-241288 | 9/1998 |
| JP | 2000-30366 | 1/2000 |
| JP | 2000-305846 | 11/2000 |
| JP | 2000-306328 | 11/2000 |

OTHER PUBLICATIONS

Li et al, Security enhanced MPEG player, 1996, IEEE, pp. 169-175.*

Japanese Office Action dated Nov. 9, 2004, for Japanese Patent Application No. 2002-079621.

* cited by examiner

INFORMATION RECORDING/REPRODUCING APPARATUS AND METHOD OF EXECUTING ENCRYPTION PROCESSING

CROSS-REFERENCE TO RELATED APPLICATIONS

This application is based upon and claims the benefit of priority from the prior Japanese Patent Application No. 2002-079621, filed Mar. 20, 2002, the entire contents of which are incorporated herein by reference.

BACKGROUND OF THE INVENTION

1. Field of the Invention

The present invention relates to an information recording/reproducing apparatus for recording or reproducing content information or the like and, more particularly, to an information recording/reproducing apparatus and method of handling, e.g., content information whose copyright is protected by inhibiting copy of the information and permitting only movement of the information.

2. Description of the Related Art

Along with the diversification of digital content information such as moving images and audio data, information recording/reproducing apparatuses with various specifications have been developed and proliferated to handle such information. With these apparatuses, various kinds of information can easily be copied. Techniques are used to sufficiently protect the copyrights of the content information.

In, e.g., digital broadcasting, content information having copyright information "copy once" that permits recording of only one generation is sometimes broadcast. When this content information is received by a receiver incorporating a hard disk drive and recorded in the hard disk drive, the recorded content information cannot be recorded on other media anymore. The content information has copyright information "copy no more". The hard disk drive has a high access speed and is therefore convenient. However, since the recording capacity of the hard disk is limited, content information that the user wants to keep long sometimes needs to be moved to another medium such as DVHS. Movement here means that the recorded copy-no-more content information is reproduced and recorded on another medium, and the original content information recorded in the hard disk drive is erased.

In recording by DVHS, content information is temporarily reproduced by the device (the receiver with the internal hard disk drive) that was used to record the information, and then recorded. In recording by the receiver with the internal hard disk drive, content information is generally encrypted and recorded to prevent any illicit copy. In a reproduction mode, if the content information that is kept encrypted is reproduced by the player and recorded by the recorder such as DVHS, the content information cannot be reproduced anymore by the device that has recorded the information. To prevent this, the encrypted information must be decrypted by the player and then output to the recorder in the reproduction mode. As a transmission line, IEEE 1394 or the like is used. The content information must be protected by using a protection mechanism such as DTCP (Digital Transmission Content Protection).

As a reference of such a conventional technique, Jpn. Pat. Appln. KOKAI Publication No. 2000-306328 is known. This reference discloses a recording/reproducing apparatus which handles content information such as audio data. To prevent illicit copy, a hash value is calculated and stored for a music database as the management information of content information. In the reproduction or copy mode, a hash value is calculated and compared with the above hash value, thereby confirming whether the music database is not altered. With this technique, illicit copy or reproduction of content information is prevented.

However, the prior art has the following problem in moving content information. That is, if an unexpected power supply interruption or operation error occurs in the apparatus during movement to DVHS serving as a recording medium, the moving operation is interrupted. In this case, it is reasonable to distinguish a portion that has already been reproduced in the content information from a portion that is not reproduced yet. It is preferable that when the power supply is restored, and movement is resumed, the portion reproduced cannot be moved, and only the portion that is not reproduced is handled as movable information. In the above-described prior art, however, both the portions become unmovable without such distinction.

Instead, content information may be managed in a shorter unit time. For example, when the encryption key of content information is changed every minute to make the key of a portion reproduced unusable, content information already reproduced and content information that is not reproduced yet can be managed. In this method, however, for example, 120 keys must be prepared for 120-min content information. It is very difficult to manage the key data.

In the above-described prior arts, if an unexpected power supply interruption or operation error occurs in the apparatus during reproduction (or movement) to DVHS serving as a recording medium, and the reproduction operation is interrupted, it is impossible to distinguish a portion that has already been reproduced in the content information from a portion that is not reproduced yet. That is, it is impossible to handle only the portion that is not reproduced yet as reproducible information. The entire content information becomes unreproducible.

In the method using many keys, key management is complex. In addition, the processing time increases, and a longer access time is required for random access to content information.

BRIEF SUMMARY OF THE INVENTION

It is an embodiment of the present invention to provide an information recording/reproducing apparatus and method, which make it possible by a simple technique to execute such management that reproduction (or movement) is permitted for a portion that is not reproduced yet and inhibited for a portion that has already been reproduced when reproduction (movement) of is content information is interrupted, and also prevent any alteration of the reproduction enable condition.

According to one embodiment of the present invention, there is provided an information recording apparatus comprising an encryption section which receives content information, encrypts the content information with an encryption key, and outputs encrypted content information, a control section which identifies an area already reproduced in the content information, and on the basis of the identification, generates a reproduction enable condition containing reproducible area information indicating a reproducible area, an arithmetic device which executes predetermined arithmetic processing for the reproduction enable condition generated by the control section and stores an arithmetic result in a predetermined area, and a recording section which records, in a storage area, the encrypted content information output from the encryption section and the reproduction enable condition generated by the control section.

According to another embodiment of the present invention with the above-described characteristic feature, an area which has already been reproduced in content information is identified and on the basis of the identification, a reproduction enable condition containing reproducible area information indicating a reproducible area is generated. The reproduction enable condition is subjected to hash calculation to ensure a hash arithmetic result. The hash arithmetic result is confirmed in reproduction or copy, thereby preventing alteration of the reproduction enable condition. Accordingly, an information recording/reproducing apparatus and method are provided in which alteration of the reproduction enable condition as management information is prevented while distinguishing a portion of content information, which has already been reproduced, from a portion that is not reproduced yet, thereby preventing any illicit copy of the content information, and simultaneously, reproduction processing after power supply interruption can also be executed.

DETAILED DESCRIPTION OF THE INVENTION

An information recording/reproducing apparatus according to one embodiment of the present invention will be described below with reference to the accompanying drawing.

<Information Recording/Reproducing Apparatus According to One Embodiment of Present Invention>

(Explanation of Outline)

Figure 3:
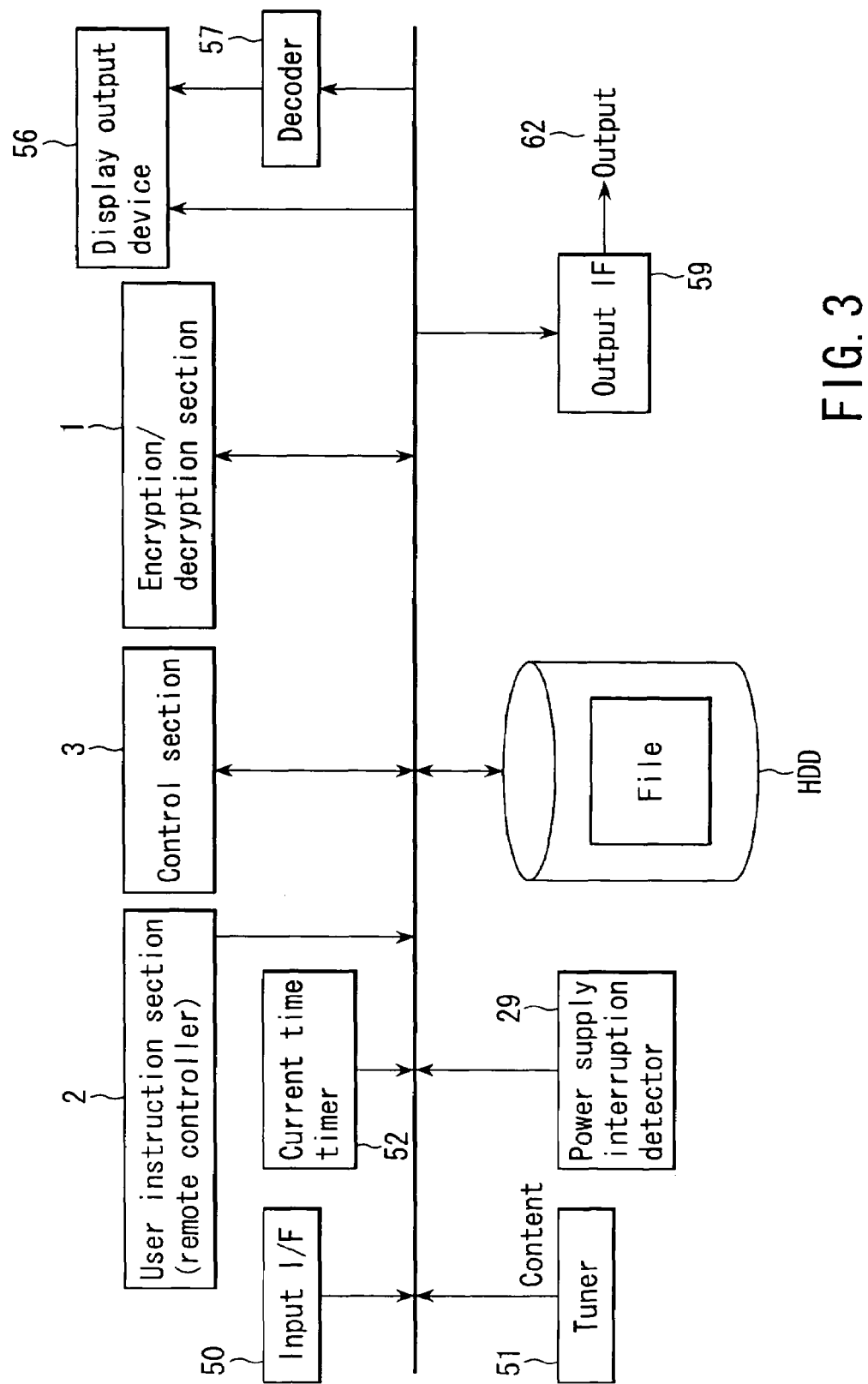
FIG. 3 is a block diagram showing the overall arrangement of the information recording/reproducing apparatus according to another embodiment of the present invention.

The outline of the information recording/reproducing apparatus according to one embodiment of the present invention will be described with reference to the accompanying drawing. FIG. 3 is a block diagram showing the schematic arrangement of the information recording/reproducing apparatus according to an embodiment of the present invention.

Referring to FIG. 3, the information recording/reproducing apparatus according to one embodiment of the present invention has an input interface 50 which receives content information or the like from an external device, a tuner 51 connected through the central data bus to receive a broadcast signal and output a reception signal, and a power supply interruption detector 29 which detects interruption of power supply to the apparatus. A control section 3 which includes a CPU and controls the entire operation and a user instruction section 2 which receives a user instruction signal from a remote controller or the like are also connected to the data bus. In addition, an encryption/decryption section 1 which encrypts/decrypts content information or the like, a decoder 57 which decodes information, and a display output device 56 on which operation information or management information of content information is displayed are connected to the data bus. Furthermore, a hard disk drive HDD which stores content information and the like is connected to the data bus. An output interface 59 is also connected to the data bus and an output terminal 62.

The outline of the operation of the information recording/reproducing apparatus with the above arrangement will be described below. First, the tuner 51 receives broadcast content information. The control section 3 reads a user instruction from a remote controller serving as the user instruction section 2. Upon receiving a recording instruction from the user, the control section 3 reads the reception time from a current time timer 52, makes the time correspond to the received content information, and records the information in the hard disk drive HDD as a file. Instead of using the timer 52 in the system, time data contained in the transmission packet of digital broadcasting may be used. The control section 3 executes recording processing in accordance with the flow chart shown in FIG. 8 (to be described later). That is, the control section 3 generates a title key T which changes for each content information title, causes the encryption/decryption section 1 to encrypt content information 22, and records encrypted content information 18 in the hard disk drive HDD. The title key T is relationship information indicating the relationship to the content information 22. The same functions and effects can be obtained by any other equivalent information.

In addition, the control section 3 executes processing in accordance with the flow chart of reproduction processing shown in FIG. 7 (to be described later) in accordance with a user instruction. If a portion of content information to be reproduced corresponds to a reproduction enable condition, the control section 3 generates the title key T serving as a decryption key, reads out the file from the hard disk drive HDD, causes the encryption/decryption section 1 to decrypt the content information, causes the decoder 57 to decode the data, and causes the display output device 56 to display the content information. If the content information is audio information, it is reproduced.

If it is determined that the content information can be copied, the content information is output from the output terminal 62 through the output interface 59.

(Recording Processing According to Present Invention)

Figure 1:
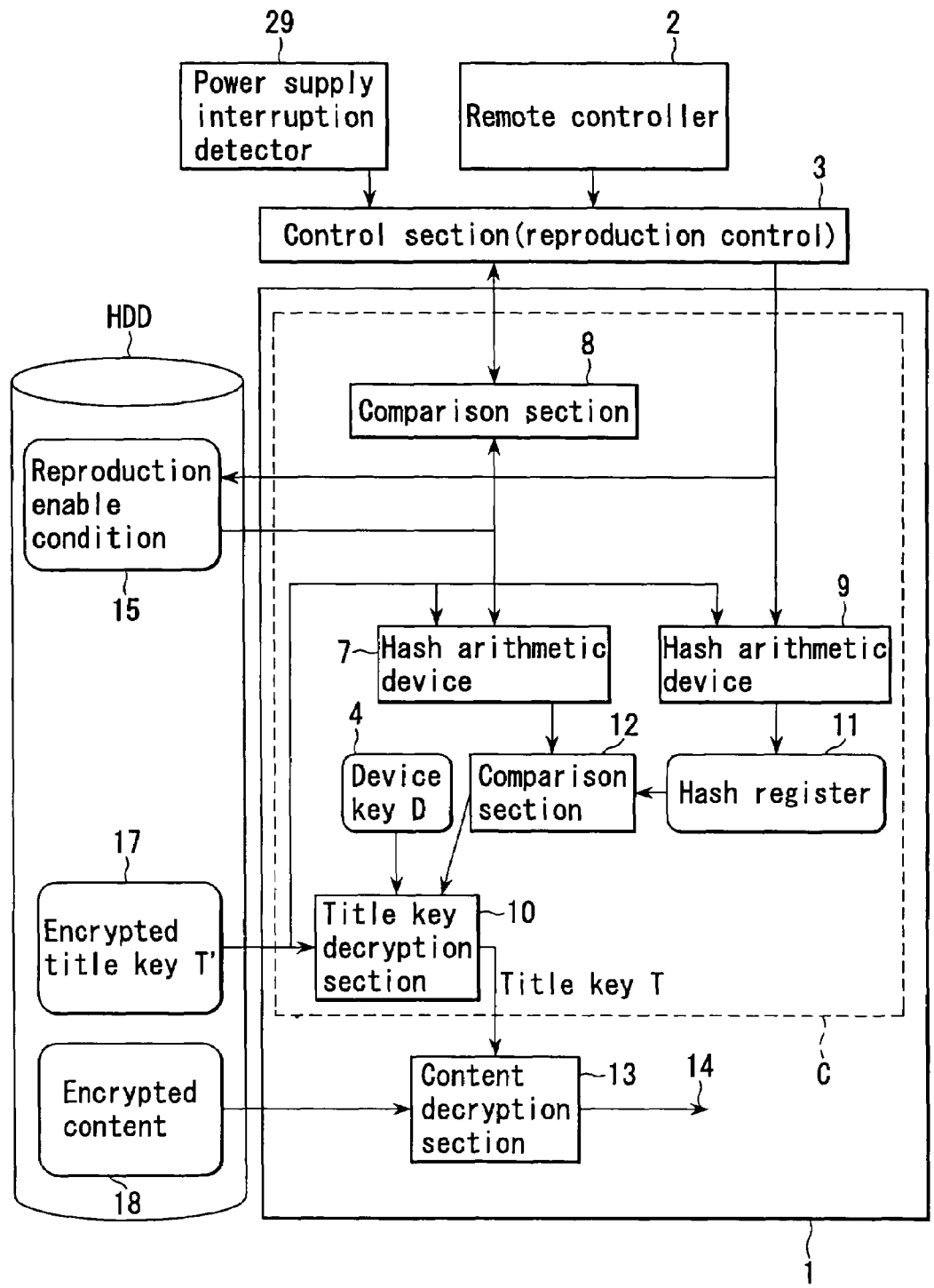
FIG. 1 is a view for explaining an information recording/reproducing apparatus according to one embodiment of the present invention mainly in association with reproduction control.
Figure 2:
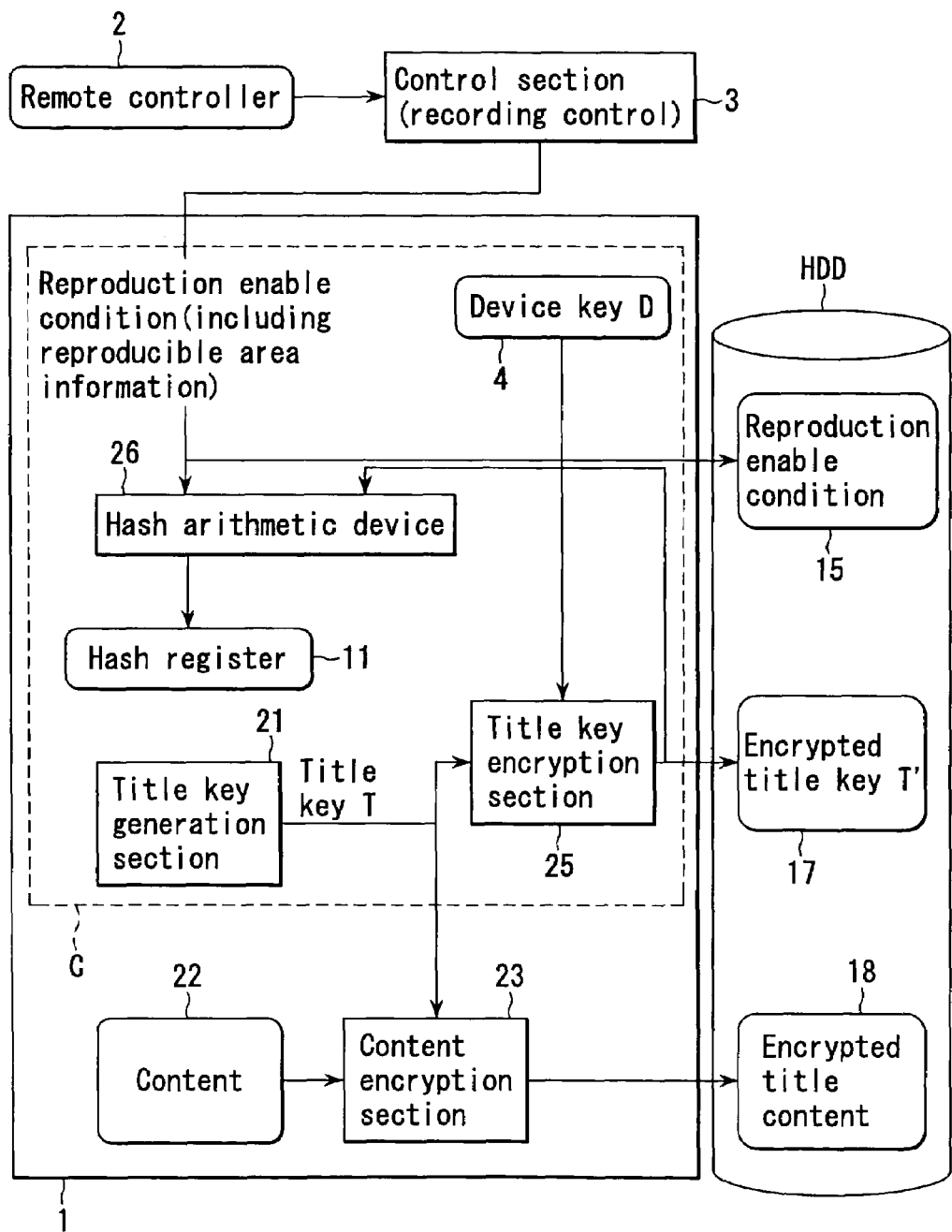
FIG. 2 is a view for explaining the information recording/reproducing apparatus according to another embodiment of the present invention mainly in association with recording control.
Figure 4:
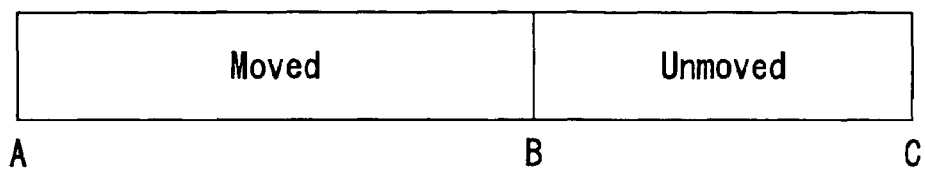
FIG. 4 is a view showing an example of recorded content information with a portion already reproduced, which is handled by the information recording/reproducing apparatus according to another embodiment of the present invention.
Figure 5:
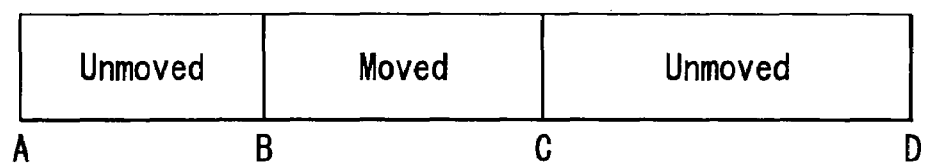
FIG. 5 is a view showing another example of recorded content information with a portion already reproduced, which is handled by the information recording/reproducing apparatus according to another embodiment of the present invention.
Figure 6:
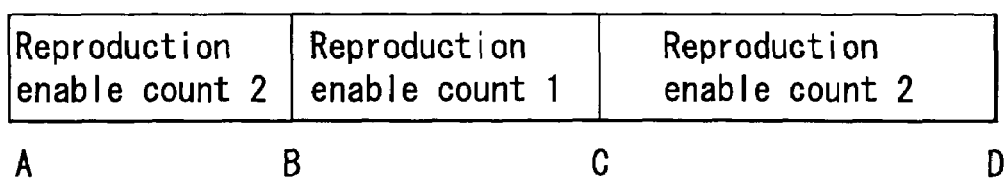
FIG. 6 is a view showing an example in which recorded content information handled by the information recording/reproducing apparatus according to another embodiment of the present invention has already been reproduced partially with different reproduction counts.

Recording processing unique to the present invention will be described below with reference to the accompanying drawing. FIG. 1 is a view for explaining the information recording/reproducing apparatus according to one embodiment of the present invention mainly in association with reproduction control. FIG. 2 is a view for explaining mainly recording control. FIGS. 4 to 6 are views showing examples of recorded content information that is partially reproduced. FIG. 7 is a flow chart for explaining reproduction processing of the information recording/reproducing apparatus embodiments of according to the present invention. FIG. 8 is a flow chart for explaining recording processing.

Content information recording processing will be described next with reference to the explanatory view shown in FIG. 2. FIG. 2 is a view for explaining processing among the encryption/decryption section 1, the remote controller serving as the user instruction section 2, the control section 3, and the hard disk drive HDD shown in FIG. 3. The broken line in the encryption/decryption section 1 indicates a one-chip C. When the structure indicated by the broken line is formed from the one-chip C, the security level can be increased.

In the above-described information recording/reproducing apparatus, the broadcast content information 22 having "copy once" copyright information that permits recording of only one generation is received. The content information may be received through the tuner 51 for BS digital broadcasting or a demodulator. Alternatively, the content information may be received from the transmission line of the input interface 50 using, e.g., IEEE 1394.

The video signal of the broadcast content information 22 as content information is compressed by MPEG (Moving Picture Experts Group) or the like. In digital broadcasting, the content information may have an MPEG2 transport stream format. In this case, a plurality of programs may be multiplexed in one stream. These programs may have different piece of copyright information. Alternatively, the plurality of programs may have "copy once" copyright information.

Some kinds of copyright information have a condition that permits copy only a finite number of times after content information is stored in the hard disk drive HDD of the receiver and then permits only watching. In some cases, only watching is permitted a finite number of times.

The control section (recording control) 3 executes control in the recording mode. The control section 3 receives a recording start instruction from the user through the remote controller serving as the user instruction section 2. At the start of recording of new content information, a title key generation section 21 generates the title key T as a material of an encryption key to be used to encrypt the content information and supplies the title key T to a title key encryption section 25 and content encryption section 23.

The control section (recording control) 3 records the copyright information obtained from the content information 22 and the content information recording start time in a reproduction enable condition file 15 in the hard disk drive HDD as a reproduction enable condition.

The reproduction enable condition is a condition for decryption of the encrypted content information and contains reproducible area information. This condition may be a reproduction count log indicating how many times an area of content information has been reproduced or a movement log indicating whether an area of content information has already been moved. The area information is specified by one or a plurality of pieces of position information. The reproduction enable condition may be set by the content information provider or by another method. The reproduction enable condition may be expressed in the form of a reproduction startable time or the start position of reproduction startable area.

The reproduction enable condition is not limited to a condition for decryption of encrypted content information. That is, the reproduction enable condition may be a condition used to determine whether decrypted content information can be output from the information recording/reproducing apparatus. If the reproduction enable condition is not satisfied, control may be executed to decrypt the content information and inhibit the content information from being output from the information recording/reproducing apparatus. In this case as well, the same functions and effects as in the present invention can be obtained.

FIG. 4 shows recorded content information. A point A indicates a recording start point. A point B indicates the position of the boundary between an area that has already been reproduced (moved) and an area that is not reproduced (moved) yet. When a plurality of programs are multiplexed in a transport stream, the programs may have independent reproduction enable conditions.

The title key generation section 21 outputs the title key T to encrypt the content information. The content encryption section 23 encrypts the content information 22 using the key and records the encrypted content information 18 in the hard disk drive HDD. In recording a program having "copy once" copyright information, since the copyright information indicates that the content information cannot be copied anymore, the content information is recorded as "copy no more".

A device key register 4 stores a key value that changes for each receiver. A device key D must not be rewritten by the user and is therefore stored in a ROM or EEPROM. If the device key D is encrypted, it may be stored not in the register but in the hard disk drive HDD as a file. Instead of using the value in the device key register 4 directly as the device key D, the encryption key stored in the hard disk drive HDD may be decrypted by the device key D and used.

The title key T is encrypted by the title key encryption section 25 using the device key D and recorded in the hard disk drive HDD as an encrypted title key T' file 17.

The control section (recording control) 3 obtains a hash value for all or some pieces of information of the reproduction enable condition recorded in the hard disk drive HDD and the encrypted title key T' as relationship information indicating the relationship between the content information and the reproduction enable condition. The obtained hash value is recorded in a hash register 11.

(Reproduction Processing According to Present Invention)

Reproduction processing for reproducing the thus recorded encrypted content information 18 will be described below in detail with reference to the accompanying drawing.

FIG. 1 is a view for explaining processing among the encryption/decryption section 1, the remote controller serving as the user instruction section 2, the control section 3, the power supply interruption detector 29, and the hard disk drive HDD shown in FIG. 3. The broken line in the encryption/decryption section 1 indicates the one-chip C. When the structure indicated by the broken line is formed from the one-chip C, the security level can be increased.

1. Determination of Reproduction Enable Condition

First, it is determined whether reproduction processing desired by the user satisfies the reproduction enable condition. The control section (reproduction control) 3 receives a reproduction start instruction and an instruction of a reproduction start position from the user through the remote controller serving as the user instruction section 2. If reproduction is to be executed together with movement of content information to DVHS, reproduction of a program having "copy no more" copyright information must be limited to a content information portion that is not moved yet.

For a stream in which a plurality of programs are multiplexed, reproduction is permitted only for content information portions that are not moved yet in each program.

Some programs can be copied or watched only a finite number of times. In this case, reproduction for copy or watching is permitted only for portions whose count in the condition is 1 or more.

A comparison section 8 reads out, from the hard disk drive HDD, a reproduction enable range indicated by the reproduction enable condition corresponding to the program to be reproduced (moved), and compares the reproduction enable range with the reproduction start position contained in the reproduction start instruction from the user. If a plurality of programs should be simultaneously reproduced (moved), comparison is done for each program. The reproduction enable count of the portion to be reproduced is also compared to determine whether it is 1 or more.

The reproduction enable condition here is reproducible area information which is given to distinguish between an area that has been reproduced and an area that is not reproduced yet in one content information. The reproduction enable condition also specifies the number of times of reproduction of each area. Accordingly, for example, when the first half of an area has been reproduced (moved), and the second half is not reproduced (moved) yet due to power supply interruption or the like, the reproduction possibility is determined for each area after the power supply is restored.

If the result of comparison processing by the comparison section 8 indicates that the user's instruction falls outside the reproduction enable range, or the reproduction enable count is 0, the result is returned to the control section 3. The control section 3 rejects the user's reproduction instruction itself. As a consequence, read control for the title key decryption section 10, content decryption section 13, hard disk drive HDD, and the like is not executed. At this time, a message, e.g., "this program has already been reproduced (moved) and therefore cannot be reproduced" is displayed using a display screen (not shown). Simultaneously, a corresponding program name may be displayed.

2. Determination of Alteration of Reproduction Enable Condition and Decryption Processing It is determined next whether the reproduction enable condition recorded in the hard disk drive HDD has not been altered.

The reproduction enable condition file 15 and encrypted title key T' file 17 are read out from the hard disk drive HDD. A hash arithmetic device 7 obtains the hash value from the value of the reproduction enable condition and the value of the encrypted title key T'.

The device key register 4 stores the device key D having a value that changes for each receiver. The device key D must not be rewritten by the user and is therefore stored in a ROM or EEPROM. If the device key D is encrypted, it may be stored not in the device key register 4 but in the hard disk drive HDD as a file. Instead of using the value in the device key register 4 directly as the device key D, the encryption key stored in the hard disk drive HDD may be decrypted by the device key D and used.

The previous hash value is read out from the hash register 11 and compared by a comparison section 12 with the output from the hash arithmetic device 7. If the result indicates coincidence, it is determined that the reproduction enable condition file 15 and encrypted title key T' file 17 in the hard disk drive HDD are not altered, i.e., the contents are reliable.

Then, using the device key D read out from the device key register 4, the title key decryption section 10 decrypts the encrypted title key T' read out from the encrypted title key T' file 17 to obtain the decrypted title key T.

If the previous hash value does not coincide with the current hash value, the decrypted title key T is not output. Hence, the content information is not decrypted. However, even if the hash values do not coincide, control may be executed to decrypt the content information and inhibit the content information from being output from the information recording/reproducing apparatus. In this case as well, the same functions and effects as in the present invention can be obtained.

If it is the first time to reproduce the recorded content information, the reproduction enable condition indicates that reproduction is possible from the recording start point to the end point. Hence, the content information can be reproduced from an arbitrary point of the recording range. If it is not the first time to reproduction the content information, a range designated by the reproduction enable condition can be reproduced. The position of data corresponding to the reproduction start position is obtained in accordance with the reproduction start position given by the user through the remote controller serving as the user instruction section 2. Then, the encrypted content information 18 is read out from the hard disk drive HDD.

The content decryption section 13 decrypts the encrypted content information 18 read out from the hard disk drive HDD using the decrypted title key T obtained from the title key decryption section 10 and outputs decrypted content information 14.

If the reproduction aims at watching, the video signal is decoded by the MPEG decoder 57 and displayed on the display output device 56.

If the reproduction aims at recording on DVHS, the decrypted content information is transmitted to the transmission line such as IEEE 1394 through the output interface 59 such as an IEEE 1394 interface.

(Content Information Moving Processing)

A case will be described next, in which content information to be reproduced has "copy no more" copyright information, and a reproduction instruction indicates movement to a recorder such as DVHS using a transmission line such as IEEE 1394.

When reproduction is started for movement (or watching), and a reproduction stop instruction is given from the user through the remote controller serving as the user instruction section 2, the portion before the reproduction end point must be erased from the hard disk drive HDD or made unreproducible.

FIG. 4 shows a case wherein reproduction is started from the beginning of recorded content information and stopped halfway. This reproduction aims at movement, though it may aim at watching. The reproduction start position designated by the user is the first point A of the recorded content information. The stop position is the point B. It is the area between the point A and the point B that has already been reproduced. This area must not be reproducible (movable). The area that is not reproduced yet, i.e., the area between the point B and a point C is the reproducible area.

FIG. 5 shows a case wherein reproduction is started from the middle point of recorded content information and stopped halfway. This reproduction aims at movement, though it may aim at watching. The reproduction position designated by the user is the point after the beginning of the recorded content information, i.e., the point B. The stop position is the point C. It is the area between the point B and the point C that has already been reproduced. This area must not be reproducible (movable). The area between the point A and the point B and that between the point C and a point D are areas that are not reproduced yet, i.e., the reproducible areas.

FIG. 6 shows a case wherein reproduction is started from the middle point of recorded content information which can be reproduced twice, and stopped halfway. The reproduction position designated by the user is the point after the beginning of the recorded content information, i.e., the point B. The stop position is the point C. The remaining reproduction enable count of the area between the point B and the point C is 1. That is, this area can be reproduced once again. The area between the point A and the point B and that between the point C and the point D are areas which can be reproduced twice again.

When the reproduction stops, that point or a point near it is added to the reproduction enable condition as one of reproducible area information and recorded in the hard disk drive HDD. In consideration of the case shown in FIG. 5 or 6, not only the reproduction stop position but the start and end points of all reproducible areas, i.e., all the points A, B, C, and D in FIG. 5 and the reproduction enable count of each area may be added to the reproduction enable condition.

In this way, reproducible area information by the information of areas that have been reproduced and areas that are not reproduced or the information of the reproduction enable count is added to the reproduction enable condition. Accordingly, after content information is partially moved or watched, all the remaining areas that can be moved or watched can be reproduced for the purpose of movement. Alternatively, an unwatched area can be reproduced only the initially given number of times.

(Update of Reproduction Enable Condition by Reproduction Stop)

The value of the reproduction enable condition that was present in the hard disk drive HDD before reproduction is updated.

When the positions A, B, C, and D are contained in the reproduction enable condition, and the reproduction start position designated by the user is defined as G, the comparison section 8 executes comparison to determine whether the point A is less than or equal to the point G, the point G is less than or equal to the point B, the point C is less than or equal to the point G, and the point G is less than or equal to the point D, thereby determining whether the program can be reproduced. In addition, it is determined whether the reproduction enable count of each area is 1 or more.

When reproduction stops, the updated reproduction enable condition is written from the control section (reproduction control) 3 into the hard disk drive HDD. A hash arithmetic device 9 executes hash calculation for the reproduction enable condition and the value of the encrypted title key 17. The result is recorded and updated in the hash register 11.

If a hash value is obtained for each reproduction enable condition of content information to be reproduced, the number of hash values equals the number of content information. Instead, the reproduction enable conditions of other content information stored may be read out from the reproduction enable condition file 15 in the hard disk drive HDD. Only one hash value may be obtained for the total value of the reproduction enable conditions, and the single hash value may be stored in the hash register 11 in correspondence with the plurality of content information.

(Update of Reproduction Enable Condition by Power Supply Interruption)

In some cases, recording stop occurs not in accordance with a user instruction but due to power supply interruption. During a short time after power supply interruption, the power may still be supplied to the apparatus, and certain processing may be executable meanwhile. In this case, the control section (reproduction control) 3 receives the detection signal from the power supply interruption detector 29 and executes processing for generating a new device key and encrypting and storing the title key after detection of power supply interruption.

If this update processing cannot be performed, the reproduction enable condition is not updated. Since the state before reproduction is held, the content information can be reproduced any number of times. In this case, it is preferable to update the reproduction enable condition by periodically generating a new device key and encrypting the title key from the content information reproduction start time.

A new device key may be generated only once at the start of reproduction. In this case, to prevent the encrypted title key generated before the actual stop from being used again later, the title key is recorded not in the hard disk drive HDD that can be freely read- or write-accessed but in, e.g., an EEPROM (not shown). The encrypted title key T' at the stop time may be recorded in the hard disk drive HDD immediately before power supply interruption or when the power supply is turned on again.

(Details of Arithmetic Processing)

The execution timing of the above-described arithmetic processing using the device key will be described next in detail with reference to the flow charts. The processing is executed by the control section (reproduction control) 3 or control section (recording control) 3.

Figure 7:
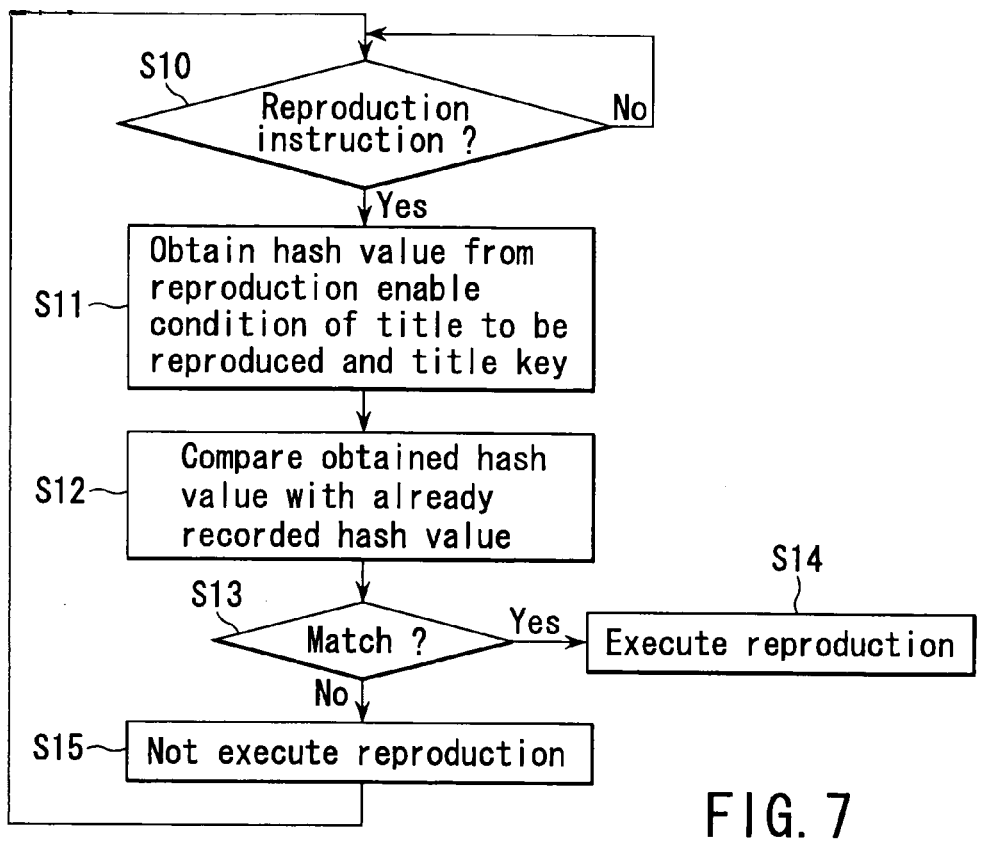
FIG. 7 is a flow chart for explaining reproduction processing of the information recording/reproducing apparatus according to another embodiment of the present invention.
Figure 8:
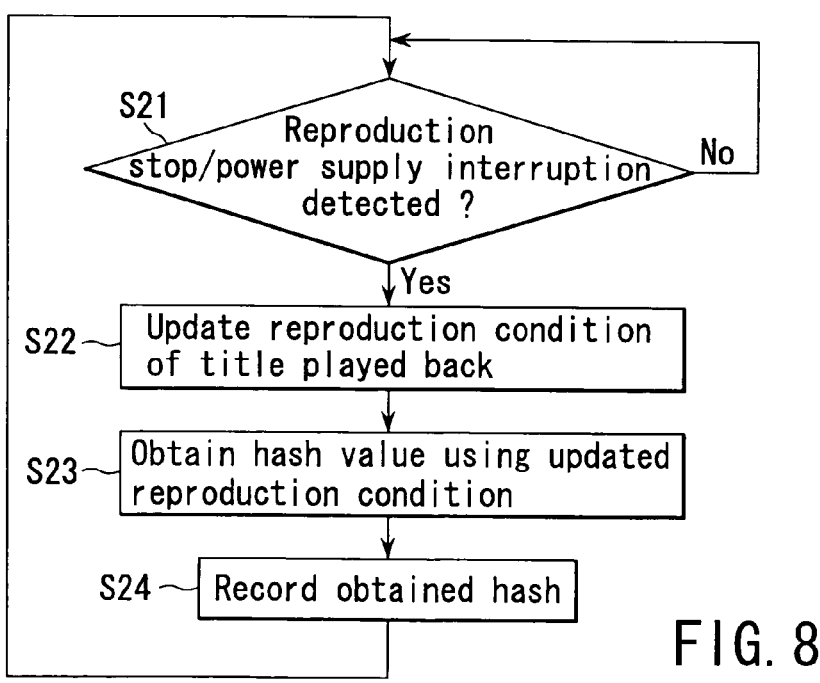
FIG. 8 is a flow chart for explaining recording processing of the information recording/reproducing apparatus according to another embodiment of the present invention.

Referring to FIG. 7 which shows a flow chart at the start of reproduction, when reproduction starts (S10), the reproduction enable condition file 15 and encrypted title key T' file 17 are read out, and a hash value is obtained from them (S11). The obtained hash value is compared with the already recorded hash value (S12). If the hash values coincide (S13), content information is decrypted and reproduced using the decrypted content information encryption key (S14). If the hash values do not coincide, the content information encryption key T' is not decrypted, the content information is not decrypted, or the content information is decrypted but not output from the information recording/reproducing apparatus, thereby preventing the content information from being output to an external device (S15).

(Update of Reproduction Enable Condition by Reproduction Stop)

The above-described processing at the time of reproduction stop will be described next in detail with reference to the flow chart shown in FIG. 8. When a reproduction stop instruction is input by the user, or power supply interruption is detected (S21), the reproduction enable condition of the title reproduced is changed at that time (S22). More specifically, the respective areas have undergone different processing operations, including processing for decreasing the reproduction enable count of the area from the reproduction start point to the end point by one or processing of defining the area as an area reproduced. The reproducible area information of each of such areas is updated and recorded as a reproduction enable condition. A new hash value is calculated using the updated reproduction enable condition (S23). The obtained hash value is recorded in the hash register 11 (S24).

When reproduction is stopped due to power supply interruption, processing in steps S22 to S24 must be executed after detection of power supply interruption. In some cases, the processing cannot be ended before complete power supply interruption because of the arrangement of the power supply circuit of the information recording/reproducing apparatus. In such a case, the processing shown in FIG. 8 is executed every predetermined time, e.g., every minute. Accordingly, even when the power supply is unexpectedly interrupted, information at the time of power supply interruption can be ensured as an updated reproduction enable condition and hash value.

(Illicit Processing Prevention by Present Invention)

Assume that a reproduction instruction is given by the user as a reproduction start and position designation for the purpose of reproduction (or movement) of a content information area that has already been reproduced (or moved). In this case, the comparison section 8 compares the position with a value read out from the reproduction enable condition file 15. It is detected on the basis of the comparison result that the position to be reproduced is a position that must not be reproduced. Hence, copy can be prevented. For a content information area that has been reproduced the number of times indicated by the reproduction enable count, reproduction can be prevented because the reproduction enable count is 0.

A case will be described, in which the reproduction enable condition file 15 is altered to return the reproduction enable position to the start of the content information area that has already been reproduced (or moved) or increase the count value. In this case, illicit copy cannot be detected by the comparison section 8. However, the arithmetic result from the hash arithmetic device 7 is compared with the content of the hash register 11 by the comparison section 12. Since the proper reproduction enable condition is different from that given to the hash arithmetic device 7, alteration can be detected. In this case as well, illicit copy can be prevented by inhibiting decryption of the content information.

In addition, the hash value is obtained by calculating the reproduction enable condition containing copyright information. For this reason, even when the copyright information or reproduction enable condition is changed, the calculation can be executed at a higher speed as compared to a case wherein the entire content information is encrypted. Hence, even when the calculation is started after reproduction is stopped or the power supply is interrupted, the calculation can be ended in a short time.

Even when the time after detection of power supply interruption until complete power supply interruption is short, reproduction processing corresponding to the reproduction condition at the time of power supply interruption can be executed because the condition at the time of interruption is recorded.

<Another Illicit Processing Prevention by Present Invention>

As possible illicit processing, for example, when the first 10-min data of content information has already been reproduced, another 10-min dummy data is added to the start of the data. When the content information is reproduced (or moved) from the 10-min dummy data, the content information can be substantially reproduced (or moved) from the beginning area. Even when there is a simple condition that allows reproduction 10 min after the start position, the illicit processing can be realized by altering the information of the 10-min position on the content information.

As a measure against this illicit processing, the encryption key information T of content information is generated by adding time information or a counter value. More specifically, in recording processing, in the description of FIG. 2, the content information is encrypted by a key having a single value generated by the title key generation section 21. Instead, a key is generated using a value obtained by calculating time information (or a counter value that is incremented by one at a simple predetermined interval) supplied from the control section 3 and the output from the title key generation section 21, and the content information is encrypted using the key.

In reproduction processing, referring to FIG. 1, a key is obtained by calculating time information generated by the control section 3 and a value decrypted by the title key decryption section 10, and the content information is decrypted by the content decryption section 13 using the key.

When key information contains time information or a counter value, the time data or counter value and the position on the content information can be uniquely connected. Accordingly, in the reproduction mode, even if illicit processing is executed by omitting/adding information from/to the start area of the content information so as to validate the result obtained in the comparison section 8 by comparing position information contained in the reproduction enable condition with the reproduction designation position from the user, the content information cannot be correctly decrypted because time data or a counter value for the 0-min position is used as a key, though the reproduction designation position is the 10-min position. When the encryption key containing time information (or a counter value) is used, the above illicit processing can be prevented.

Those skilled in the art can implement the present invention by the above-described various embodiments. It is easy for those skilled in the art to make various changes and modifications of the embodiments. It is easy to apply the invention to various embodiments without any inventive capability. The present invention is therefore constructed broadly within the spirit and scope that are not inconsistent with its disclosed principle and new features and is not limited to the above-described embodiments.

For example, in the above-described embodiments, the content information is decrypted by the title key T. The title key T is encrypted by the device key D unique to the receiver. However, the content information encryption method is irrelevant to the characteristic feature of the present invention, i.e., the functions and effects of management of reproduction enable information for each of areas with different use logs in the content information and prevention of alteration of the reproduction enable information according to one embodiment of the present invention. Hence, the content information need not always be encrypted. The functions and effects of the present invention can be obtained by determining the reproduction enable condition or determining alteration of the reproduction enable condition for each of the areas with different use logs.

The presence/absence of encryption of content information and the encryption method can freely be changed within the spirit and scope of the present invention.

In addition, in the above-described embodiment, the reproduction enable condition is calculated by hash calculation. Alteration is detected by comparing calculation results. The arithmetic processing executed here is not limited to hash calculation. Any other logical operation can be used to obtain the same functions and effects as described above.

The object of hash calculation can be only the reproduction enable condition or can contain the encrypted title key T', time information, and any other information without largely departing from the spirit and scope of the present invention. The same functions and effects as described above can be obtained.

In addition, in the above-described embodiment, the reproducing processing is controlled with the reproduction enable condition, however, it is possible that the reproducing processing is controlled with "a reproduction unable condition" which shows a condition of case that the reproducing processing can not performed. When the reproduction unable condition is used, the encryption process and hash calculation are performed as same manner as the case of the reproduction enable condition case.

As has been described above in detail, the present invention provides an information recording/reproducing apparatus and method in which, in consideration of interruption of reproduction of content information, the reproduction enable condition is updated including reproducible area information for the remaining area. With this processing, even when reproduction is interrupted, reproduction of the remaining area that is not reproduced yet is ensured. Simultaneously, alteration of the reproduction enable condition of the content information is detected using, e.g., hash calculation, thereby preventing illicit reproduction of the content information by arithmetic processing with a small processing amount.

What is claimed is:

1. An information recording/reproducing apparatus comprising:
    a setting section which receives content information and sets a reproduction enable condition for the received content information;
    a power supply interruption detector which detects that a power supply has been interrupted;
    an updating section which updates the reproduction enable condition, including an area already reproduced and an area not reproduced yet, when reproduction of the content information is started and stopped, or when the power supply interruption detector detects interruption of the power supply and playback is stopped;
    an encryption section which encrypts the content information with key information and stores the encrypted content information;
    an arithmetic section which executes an arithmetic processing for information about the reproduction enable condition updated by the updating section and stores an arithmetic result;
    a reproduction enable condition determining section which determines, upon receipt of a reproduction start instruction, whether the instruction coincides with the reproduction enable condition updated by the updating section;
    an alternation determining section which obtains an arithmetic result by executing an arithmetic processing for information about the reproduction enable condition used by the reproduction enable condition determining section when the reproduction enable condition determining section determines that the reproduction start instruction coincides with the reproduction enable condition, compares the obtained arithmetic result with the arithmetic result stored by the arithmetic section, and determines that the reproduction enable condition has not been altered when the compared arithmetic results coincide;
    a decryption section which decrypts the content information encrypted by the encryption section using an encryption key and outputs the decrypted content information when the alternation determining section determines that alternation has not occurred, and does not decrypt the content information or does not output a signal decrypted from the content information using the encryption key when the alternation determining section determines that alternation has occurred.

2. An information recording/reproducing apparatus according to claim 1, wherein the arithmetic section and the alternation determining section executes an arithmetic processing for relationship information which indicates a relationship between the reproduction enable condition set by the setting section and the content information, and information about the reproduction enable condition, and compares arithmetic results.

3. An information recording/reproducing apparatus according to claim 1, wherein the encryption key used by the encryption section and the decryption section is relationship information which indicates a relationship between the content information and the reproduction enable condition, the apparatus encrypts the relationship information with a second encryption key, stores the encrypted relationship information, decrypts the encrypted relationship information using the second encryption key when the alternation determining section determines that alternation has not occurred, and reproduces or outputs the decrypted relationship information.

4. An information recording/reproducing apparatus according to claim 1, wherein the reproducing enable condition contains reproduction count information which indicates a number of times of reproduction of a predetermined area of the content information.

5. An information recording/reproducing apparatus according to claim 1, wherein each of the arithmetic section and the alternation determining section executes an arithmetic processing for relationship information which indicates a relationship between the reproduction enable condition set by the setting section and the content information, information about the reproduction enable condition, and the encryption key used by the encryption section and the decryption section, and compares arithmetic results.

6. An information recording/reproducing apparatus according to claim 1, wherein each of the arithmetic portion and the alternation determining section executes hash calculation for the reproduction enable condition and obtains an arithmetic result.

7. A method of processing information from an information recording/reproducing apparatus comprising:
    receiving content information;

setting a reproduction enable condition for the received content information;

detecting interruption of power supply;

updating the reproduction enable condition, including an area already reproduced and an area not reproduced yet, when reproduction of the content information is started and stopped or when the interruption of the power supply has been detected and playback is stopped;

encrypting the content information with encryption key information;

storing the encrypted content information;

executing an arithmetic processing for information about the reproduction enable condition updated by the updating section and storing an arithmetic result;

determining, upon receipt of a reproduction start instruction, whether the instruction coincides with the updated reproduction enable condition;

obtaining an arithmetic result by executing an arithmetic processing for information about the reproduction enable condition when it is determined that the reproduction start instruction coincides with the reproduction enable condition;

comparing the obtained arithmetic result with the stored arithmetic result;

determining that the reproduction enable condition has not been altered when the compared arithmetic results coincide; and decrypting the encrypted content information by using an encryption key outputting the decrypted content information when it is determined that alternation has not occurred.

8. A processing method according to claim 7, wherein the executing an arithmetic processing and the obtaining an arithmetic result performs an arithmetic processing for relationship information that indicates a relationship between the set reproduction enable condition and the content information, and information about the reproduction enable condition, and compares arithmetic results.

9. A processing method according to claim 7, wherein the encryption key and the decrypting includes relationship information that indicates a relationship between the content information and the reproduction enable condition, encrypts the relationship information with a second encryption key, storing the encrypted relationship information, decrypting the encrypted relationship information using the second encryption key when it is determined that alternation has not occurred, and reproducing or outputting the decrypted relationship information.

10. A processing method according to claim 7, wherein the reproducing enable condition contains reproduction count information which indicates a number of times of reproduction of a predetermined area of the content information.

11. A processing method according to claim 7, wherein each of the executing an arithmetic processing and the obtaining an arithmetic result performs an arithmetic processing for relationship information which indicates a relationship between the reproduction enable condition set by the setting section and the content information, information about the reproduction enable condition, and the encryption key and the decrypting, and comparing arithmetic results.

12. A processing method according to claim 7, each of the executing an arithmetic processing and the obtaining an arithmetic result performs hash calculation for the reproduction enable condition and obtains an arithmetic result.

* * * * *